(12) United States Patent
Dhanuka

(10) Patent No.: US 10,952,075 B2
(45) Date of Patent: Mar. 16, 2021

(54) ELECTRONIC APPARATUS AND WIFI CONNECTING METHOD THEREOF

(71) Applicant: SAMSUNG ELECTRONICS CO., LTD., Suwon-si (KR)

(72) Inventor: Ankit Dhanuka, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/654,693

(22) Filed: Oct. 16, 2019

(65) Prior Publication Data

US 2020/0162911 A1    May 21, 2020

(30) Foreign Application Priority Data

Nov. 16, 2018 (KR) .................... 10-2018-0141991

(51) Int. Cl.
*H04W 12/06* (2021.01)
*G06F 21/32* (2013.01)
(Continued)

(52) U.S. Cl.
CPC ............ *H04W 12/06* (2013.01); *G06F 21/32* (2013.01); *H04L 63/0861* (2013.01); *H04W 12/00305* (2019.01); *H04W 48/16* (2013.01); *H04W 76/10* (2018.02); *H04W 84/12* (2013.01); *H04W 88/06* (2013.01)

(58) Field of Classification Search
CPC ..... H04W 4/80; H04W 76/10; H04W 12/003; H04W 12/0608; H04W 48/14; H04W 48/16; H04W 76/11; H04W 76/14; H04W 84/12; H04W 84/18; H04W 88/06; H04W 88/08; H04W 8/005; G10K 2210/108; G06F 3/16; G10L 15/22
See application file for complete search history.

(56) References Cited

U.S. PATENT DOCUMENTS 10,015,304 B2   7/2018   Lee et al.
10,149,329 B2   12/2018  Yu et al.
(Continued)

FOREIGN PATENT DOCUMENTS

EP    2 725 850 A2       4/2014
KP    10-2015-0026870 A  3/2015
(Continued)

OTHER PUBLICATIONS

Written Opinion (PCT/ISA/237) dated Jan. 16, 2020, issued by the International Searching Authority in counterpart International Application No. PCT/KR2019/013212.
(Continued)

*Primary Examiner* — Liton Miah
(74) *Attorney, Agent, or Firm* — Sughrue Mion, PLLC

(57) ABSTRACT

A voice assistant of an electronic apparatus receives a user voice requesting connection of WiFi communication between an external electronic apparatus and an access point, transmits authentication information for authentication of the external electronic apparatus to be displayed on the external electronic apparatus, and based on receiving a user voice corresponding to the authentication information being displayed, transmits connection information for establishing the WiFi communication to the external electronic apparatus.

12 Claims, 12 Drawing Sheets

(51) Int. Cl.
*H04L 29/06* (2006.01)
*H04W 84/12* (2009.01)
*H04W 12/00* (2021.01)
*H04W 88/06* (2009.01)
*H04W 48/16* (2009.01)
*H04W 76/10* (2018.01)

(56) References Cited

U.S. PATENT DOCUMENTS

| | | | |
|---|---|---|---|
| 10,327,271 | B2 | 6/2019 | Shim |
| 10,524,225 | B1 * | 12/2019 | Boross ................. G01S 5/0295 |
| 2008/0175187 | A1 | 7/2008 | Lowry et al. |
| 2012/0319951 | A1 | 12/2012 | Lee |
| 2014/0104990 | A1 | 4/2014 | Shim |
| 2014/0119234 | A1 * | 5/2014 | Kwon ..................... H04W 4/80 370/254 |
| 2014/0308898 | A1 | 10/2014 | Lee et al. |
| 2016/0021531 | A1 | 1/2016 | Kim et al. |
| 2016/0212692 | A1 | 7/2016 | Lee et al. |
| 2016/0379644 | A1 | 12/2016 | Li et al. |
| 2017/0085698 | A1 | 3/2017 | Lee et al. |
| 2017/0094704 | A1 | 3/2017 | Yu et al. |
| 2017/0206896 | A1 * | 7/2017 | Ko ........................... G10L 15/22 |
| 2018/0335986 | A1 * | 11/2018 | Tanaka .................... G06F 3/167 |
| 2019/0253324 | A1 * | 8/2019 | Kapinos .................. G06F 3/167 |
| 2019/0334782 | A1 * | 10/2019 | Dellinger ................ H04L 41/12 |
| 2020/0134144 | A1 * | 4/2020 | Depaolo .................. G06F 9/453 |

FOREIGN PATENT DOCUMENTS

| | | |
|---|---|---|
| KR | 10-2014-0049365 A | 4/2014 |
| KR | 10-2014-0124304 A | 10/2014 |
| KR | 10-2017-0035654 A | 3/2017 |
| KR | 10-2017-0037304 A | 4/2017 |
| KR | 10-2018-0051284 A | 5/2018 |
| WO | 2011112027 A2 | 9/2011 |

OTHER PUBLICATIONS

International Search Report (PCT/ISA/210) dated Jan. 16, 2020, issued by International Searching Authority in counterpart International Application No. PCT/KR2019/013212.
Communication dated Apr. 15, 2020 issued by the European Patent Office in European Application No. 19202947.8.

* cited by examiner

ELECTRONIC APPARATUS AND WIFI CONNECTING METHOD THEREOF

CROSS-REFERENCE TO RELATED APPLICATION(S)

This application is based on and claims priority under 35 U.S.C. § 119(a) from Korean Patent Application Number 10-2018-0141991, filed on Nov. 16, 2018, in the Korean Intellectual Property Office, the disclosure of which is incorporated by reference herein in its entirety.

BACKGROUND

1. Field

The disclosure relates to an electronic apparatus and a WiFi connecting method thereof, and more particularly, to an electronic apparatus providing a voice assistant and a WiFi connecting method thereof.

2. Description of Related Art

Recently, artificial intelligence systems implementing intelligence mimicking a human have been applied in various fields. An artificial intelligence system refers to a system in which a machine learns, determines, and becomes smarter, unlike conventional rule-based smart systems. An artificial intelligence system shows a more improved recognition rate as iterative analysis is performed, and becomes capable of more accurately understanding user preference, for example. For this reason, conventional rule-based smart systems are gradually being replaced by deep learning-based artificial intelligence systems.

Artificial intelligence technology consists of machine learning (for example, deep learning) and element technologies utilizing machine learning.

Machine learning refers to an algorithmic technology of classifying and/or learning characteristics of input data by itself. Element technology refers to a technology of simulating functions of a human brain, such as cognition and determination, by using a machine learning algorithm, such as deep learning, and includes fields of technologies such as linguistic understanding, visual understanding, inference/prediction, knowledge representation, and operation control.

Currently, artificial intelligence technologies are being implemented in various fields, and in particular, a voice assistant (or, a voice assistant service) for providing a response to a user input (in particular, a user voice) by using an artificial intelligence model has being developed.

In the context of an electronic apparatus connected to an access point through WiFi communication to access a network, in the past, a user inputs a password to an electronic apparatus for connection to an access point (AP). In the case of such a method, there is a disadvantage that, in case a user does not remember the password, connection to an access point may be restricted. Also, in the case of an electronic apparatus having a large-sided display like a TV, for example, there is inconvenience in inputting a password.

Accordingly, there is a demand for convenient methods of connecting an electronic apparatus to an access point.

SUMMARY

The disclosure may address the aforementioned needs, to provide convenient methods of connecting an electronic apparatus to an access point. Accordingly, the disclosure provides an electronic apparatus which connects an external electronic apparatus to an access point by using a user voice, and a WiFi connecting method thereof.

An electronic apparatus providing a voice assistant according to an embodiment of the disclosure includes a communicator and a processor configured receive a first user voice comprising a request to establish WiFi communication between an external electronic apparatus and an access point using voice recognition of the electronic apparatus, transmit to the external electronic apparatus through the communicator authentication information for authentication of the external electronic apparatus to be displayed on the external electronic apparatus, receive a second user voice corresponding to the authentication information displayed on the external electronic apparatus using the voice recognition of the electronic apparatus, and transmit connection information for establishing the WiFi communication between the external electronic apparatus and the access point to the external electronic apparatus through the communicator.

In this case, the processor may determine that the first user voice comprises the request to establish WiFi communication between the external electronic apparatus and the access point and transmit the authentication information to the external electronic apparatus through the communicator based on a result of determining that the first user voice comprises the request to establish WiFi communication between the external electronic apparatus and the access point.

Also, the processor may receive a probe request frame transmitted by the external electronic apparatus through the communicator and transmit the authentication information to the external electronic apparatus through the communicator based on receiving the probe request frame.

In this case, in the probe request frame, a bit value of a first area may be set as a first value.

Also, the processor may transmit a probe response frame comprising the authentication information to the external electronic apparatus through the communicator based on receiving the probe request frame.

In addition, the processor may control the electronic apparatus to output a voice requesting a user to speak the authentication information displayed on the external electronic apparatus.

In this case, the processor may, after transmitting the probe response frame to the external electronic apparatus, control the electronic apparatus to output the voice requesting the user to speak the authentication information displayed on the external electronic apparatus.

Also, in the probe request frame, a bit value of a second area may be set as a second value.

In addition, the processor may, determine that the second user voice corresponds to the authentication information displayed on the external electronic apparatus and transmit the connection information to the external electronic apparatus through the communicator based on determining that the second user voice corresponds to the authentication information displayed on the external electronic apparatus.

Further, the authentication information may include a pin code, and the connection information may include at least one of an SSID, a password, or a security type of the access point.

Meanwhile, a method of establishing WiFi communication between an external electronic apparatus and an access point using an electronic apparatus providing a voice assistant according to an embodiment of the disclosure includes the steps of receiving a first user voice comprising a request to establish the WiFi communication between the external electronic apparatus and the access point using voice recognition of the electronic apparatus, transmitting to the external electronic apparatus through the electronic apparatus authentication information for authentication of the external electronic apparatus to be displayed on the external electronic apparatus, receiving a second user voice corresponding to the authentication information displayed on the external electronic apparatus using the voice recognition of the electronic apparatus, and transmitting connection information for establishing the WiFi communication between the external electronic apparatus and the access point to the external electronic apparatus through the electronic apparatus.

In this case, the step of transmitting authentication information includes determining that the first user voice comprises the request to establish WiFi communication between the external electronic apparatus and the access point and transmitting the authentication information to the external electronic apparatus through the electronic apparatus based on a result of the determining.

Also, the step of transmitting authentication information includes receiving a probe request frame transmitted by the external electronic apparatus and transmitting the authentication information to the external electronic apparatus based on receiving the probe request frame.

In this case, in the probe request frame, a bit value of a first area may be set as a first value.

In addition, the step of transmitting authentication information includes transmitting a probe response frame comprising the authentication information to the external electronic apparatus based on receiving the probe request frame.

Also, a WiFi connecting method according to an embodiment of the disclosure may further include the step of outputting a voice requesting a user to speak the authentication information displayed on the external electronic apparatus.

In this case, the step of outputting includes after transmitting the probe response frame to the external electronic apparatus, outputting the voice requesting the user to speak the authentication information displayed on the external electronic apparatus.

In this case, in the probe request frame, a bit value of a second area may be set as a second value.

Also, the step of transmitting connection information includes determining that the second user voice corresponds to the authentication information displayed on the external electronic apparatus and transmitting the connection information to the external electronic apparatus based on determining that the second user voice corresponds to the authentication information displayed on the external electronic apparatus.

In addition, the authentication information may include a pin code, and the connection information may include at least one of an SSID, a password, or a security type of the access point.

As described above, according to an embodiment of the disclosure, a user can connect an electronic apparatus to an access point more easily through a voice, and thus convenience can be improved.

DETAILED DESCRIPTION

Figure 1A:
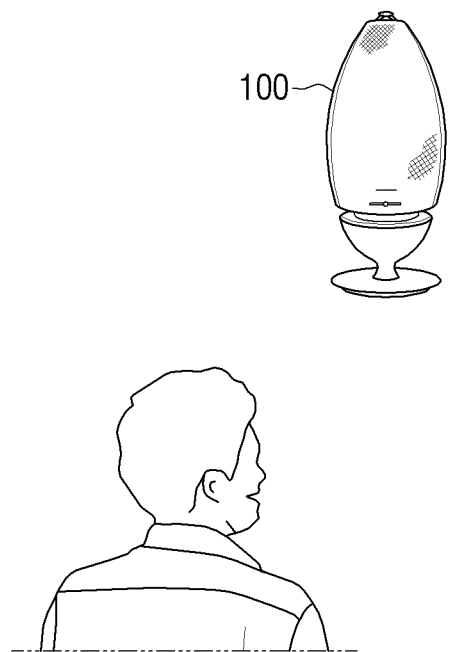
FIG. 1A is a diagram illustrating an electronic apparatus providing a voice assistant according to an embodiment of the disclosure.

Hereinafter, various embodiments of the disclosure will be described with reference to the accompanying drawings. However, it should be noted that the various embodiments are not for limiting the scope of the technology described in the disclosure to a specific embodiment, but the embodiments should be interpreted to include all modifications, equivalents, and/or alternatives of the embodiments disclosed herein. Meanwhile, with respect to the detailed description of the drawings, similar components may be designated by similar reference numerals.

Also, in the disclosure, expressions such as "have," "may have," "include" and "may include" should be construed as denoting that there are such characteristics (e.g., elements such as numerical values, functions, operations and components), and the expressions are not intended to exclude the existence of additional characteristics.

In addition, in the disclosure, expressions such as "A or B," "at least one of A and/or B," and "one or more of A and/or B" and the like may include all possible combinations of the listed items. For example, "A or B," "at least one of A and B" or "at least one of A or B" refer to all of the following cases: (1) including at least one A, (2) including at least one B or (3) including at least one A and at least one B.

Meanwhile, the expressions "first," "second" and the like used in the disclosure may be used to describe various elements regardless of any order and/or degree of importance. Such expressions are used only to distinguish one element from another element, and are not intended to limit the elements.

Also, the description in the disclosure that one element (e.g., a first element) is "(operatively or communicatively) coupled with/to" or "connected to" another element (e.g., a second element) should be interpreted to include both the configuration in which one element is directly coupled to another element, and the configuration in which one element is coupled to another element through another intervening element (e.g., a third element). In contrast, the description that one element (e.g., a first element) is "directly coupled" or "directly connected" to another element (e.g., a second element) can be interpreted to mean that another intervening element (e.g., a third element) does not exist between the element and the other element.

In addition, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Figure 1B:
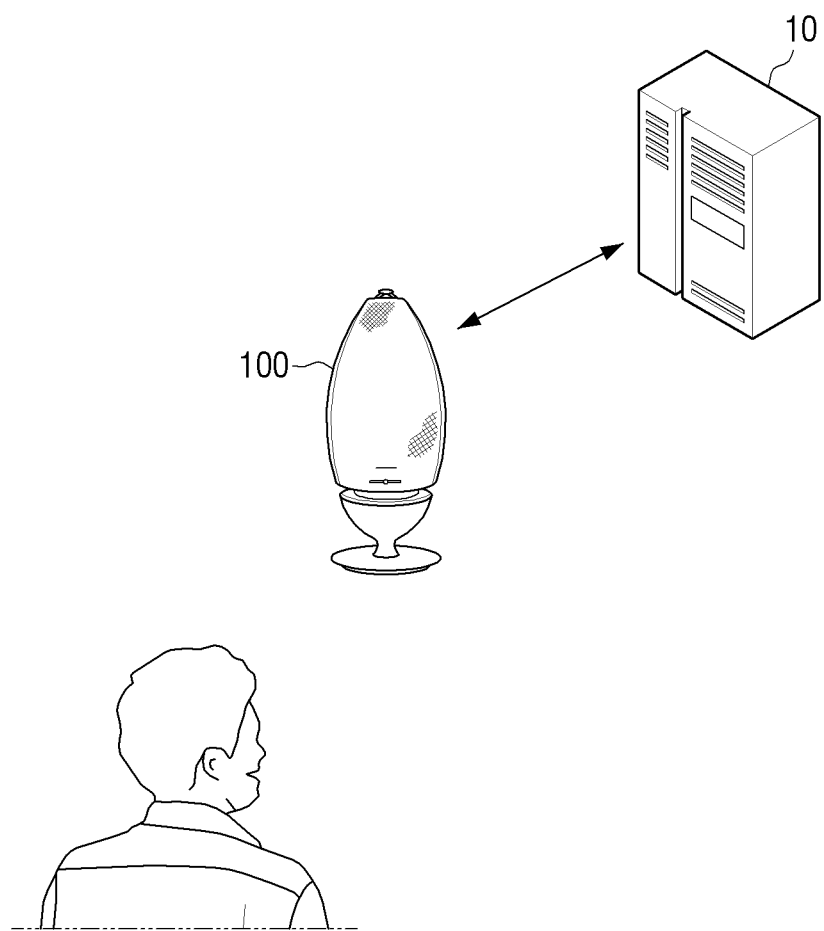
FIG. 1B is a diagram illustrating an electronic apparatus providing a voice assistant according to an embodiment of the disclosure.
Figure 1C:
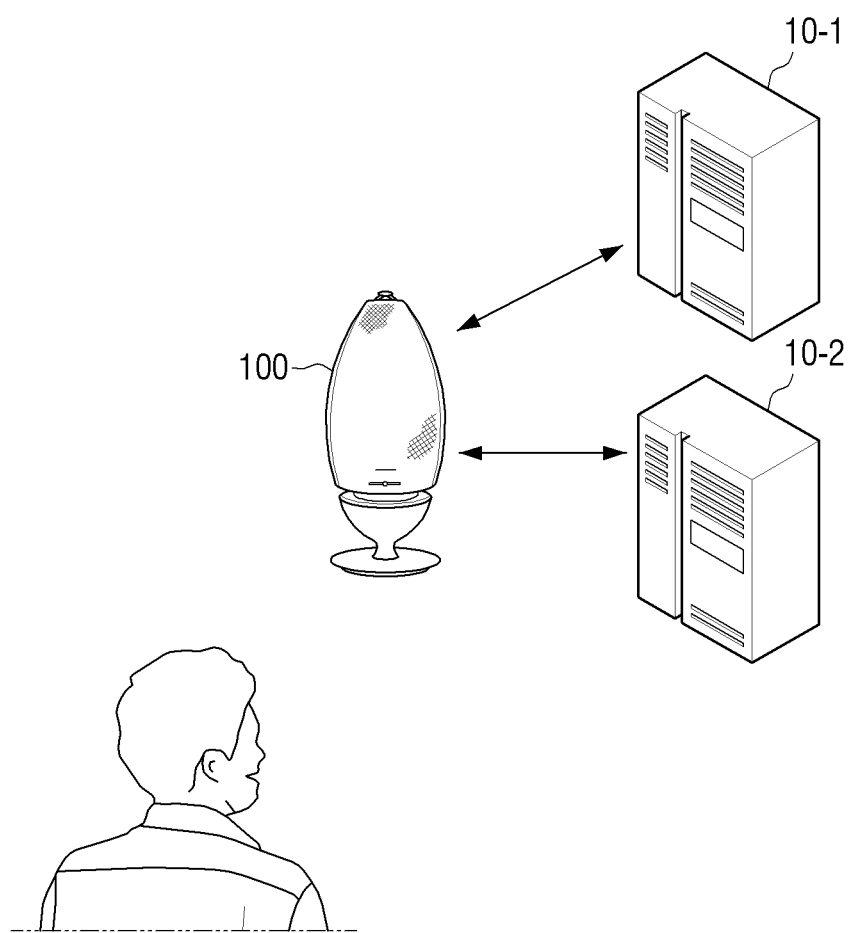
FIG. 1C is a diagram illustrating an electronic apparatus providing a voice assistant according to an embodiment of the disclosure.

FIGS. 1A, 1B, and 1C are diagrams illustrating an electronic apparatus providing a voice assistant according to embodiments of the disclosure.

In FIGS. 1A to 1C, an electronic apparatus 100 is illustrated in the form of a speaker (or, an artificial intelligence (AI) speaker). However, this is merely an example, and the electronic apparatus 100 may be implemented as various types of devices such as a smartphone, a tablet PC, a mobile phone, a video phone, an e-book reader, a desktop PC, a laptop PC, a netbook computer, a TV, a refrigerator, an air conditioner, a cleaner, an oven, a microwave oven, a washing machine, an air purifier, a set-top box, a home automation control panel, a security control panel, a media box, a game console, an electronic dictionary, an electronic key, a camcorder, an electronic picture frame, and a wearable device.

Referring to FIG. 1A, the electronic apparatus 100 may provide a voice assistant service.

The electronic apparatus 100 may obtain, receive, or otherwise acquire a user voice. The user voice may be received through a microphone provided on or within the electronic apparatus 100. Alternatively, the electronic apparatus 100 may receive a user voice obtained from another electronic apparatus equipped with a microphone, for example, a remote controller for controlling the electronic apparatus 100, etc. from the electronic apparatus.

Then, the electronic apparatus 100 may perform voice recognition of the user voice, and convert the user voice into text by a speech-to-text (STT) conversion process, and identify the intent and the entity of the user voice based on a result of voice recognition. Further, the electronic apparatus 100 may obtain a natural language response in reply to the user voice, based on a result of understanding a natural language, and provide the response to the user.

For example, with respect to a user voice having an intent of inquiring about the weather, the electronic apparatus 100 may query a web server for current weather conditions corresponding to the user voice, obtain a natural language result indicating the current weather as a response to the user voice, convert the obtained natural language into a voice through text-to-speech (TTS), and output the voice through the speaker of the electronic apparatus 100 or an external speaker connected to the electronic apparatus 100.

As a result, a conversation system may provide a response to the user voice, and a user becomes capable of more naturally interacting with the electronic apparatus 100.

To process user speech, the electronic apparatus 100 may include an automatic speech recognition (ASR) module, a natural language understanding (NLU) module, a dialogue management (DM) module, a natural language generation (NLG) module, etc.

The electronic apparatus 100 may also store an artificial intelligence agent for operating a conversation system.

Specifically, the electronic apparatus 100 may use an artificial intelligence agent to generate a natural language response in reply to a user voice. An artificial intelligence agent is a dedicated program for providing services based on artificial intelligence (AI) (e.g., a voice recognition service, an agent service, a translation service, a search service, etc.), and may be executed by a conventional generic-purpose processor (e.g., a CPU) or a separate AI-dedicated processor (e.g., a GPU, etc.). In particular, an artificial intelligence agent may control various modules.

Also, the electronic apparatus 100 according to an embodiment of the disclosure may store an artificial intelligence model trained to generate (or obtain) a natural language. In the disclosure, a trained artificial intelligence model may be constructed in consideration of the field to which a recognition model is applied or the computer performance of a device, etc. To generate a smooth natural language, a trained artificial intelligence model may be, for example, a model based on a neural network. Also, an artificial intelligence model may be designed to simulate a human brain structure on a computer, and may include a plurality of network nodes having weights that simulate a neuron of the neural network of a human. The plurality of network nodes may each form a connection relationship so that the neuron simulates synaptic activity of the neuron exchanging a signal via a synapse. In addition, the trained artificial intelligence model may include, for example, a neural network model or a deep learning model developed from a neural network model. In the deep learning model, the plurality of network nodes may exchange data according to a convolution connection relationship while being located at different depths (or layers). Examples of the trained artificial intelligence model may include a deep neural network (DNN), a recurrent neural network (RNN), a bidirectional recurrent deep neural network (BRDNN), and the like, but the artificial intelligence model is not limited thereto.

Meanwhile, as described above, for voice recognition, operations such as converting a user voice into a text, and recognizing meaning in the text (e.g., identifying the intent and the entity, etc.), etc. are performed. With respect to this, in the aforementioned embodiment, it was described that such operations are performed at the electronic apparatus 100, but the operations may be performed by another apparatus, such as a server.

For example, as in FIG. 1B, the electronic apparatus 100 may transmit a user voice to a server 10.

In this case, the server 10 may perform voice recognition of the user voice, convert the user voice into a text, and identify the intent and the entity of the user voice based on a result of the voice recognition. Then, the server 10 may obtain a natural language response in reply to the user voice based on a result of understanding a natural language, and transmit the obtained natural language to the electronic apparatus 100.

In this case, the electronic apparatus 100 may provide a response to the user voice based on the response information received from the server 10. For example, the electronic apparatus 100 may convert a text included in the response information received from the server 10 into a voice, and output the voice. Alternatively, the server 10 may provide the voice response to the electronic apparatus 100, and the electronic apparatus may output the voice response to the user.

As another example, as in FIG. 1C, the electronic apparatus 100 may transmit a user voice to a server 10-1.

In this case, the server 10-1 may perform voice recognition of the user voice, and convert the user voice into a text, and transmit the text to the electronic apparatus 100.

Meanwhile, the electronic apparatus 100 may transmit the text received from the server 10-1 to another server 10-2. The server 10-2 may identify the intent and the entity of the user voice based on the text received from the electronic apparatus 100. Then, the server 10-2 may obtain a natural language response in reply to the user voice based on a result of understanding a natural language, and transmit the obtained natural language to the electronic apparatus 100.

In this case, the electronic apparatus 100 may provide a response to the user voice based on the response information received from the server 10-2. For example, the electronic apparatus 100 may convert a text included in the response information received from the server 10-2 into a voice, and output the voice.

As described above, a response to a user voice may be provided through various methods.

Meanwhile, according to an embodiment of the disclosure, the electronic apparatus 100 may control connection of WiFi communication with an external electronic apparatus based on a user voice.

Here, an external electronic apparatus is an example, and may be implemented as a TV equipped with a display and a WiFi chip for WiFi communication. However, this is merely an example, and the external electronic apparatus may be implemented as various types of devices such as a tablet PC, a mobile phone, a video phone, an e-book reader, a desktop PC, a laptop PC, a netbook computer, a refrigerator, an air conditioner, a cleaner, an oven, a microwave oven, a washing machine, an air purifier, and a set-top box.

Specifically, the electronic apparatus 100 may authenticate an external electronic apparatus based on a user voice, and when the external electronic apparatus is authenticated, the electronic apparatus 100 may transmit connection information for connection to an access point (AP) connected to the electronic apparatus 100 to the external electronic apparatus. Accordingly, the external electronic apparatus may perform connection to an access point based on the connection information received from the electronic apparatus 100.

As described above, according to an embodiment of the disclosure, a user can connect an electronic apparatus to an access point more easily through a voice, and thus convenience can be improved.

Figure 2A:
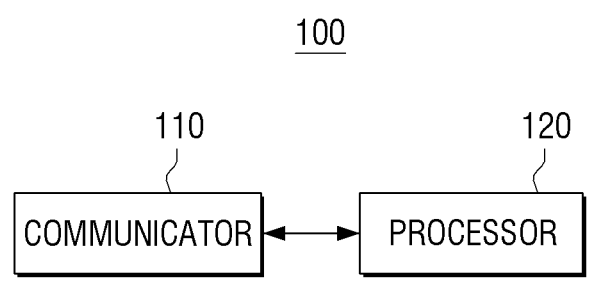
FIG. 2A is a block diagram illustrating a configuration of an electronic apparatus according to an embodiment of the disclosure.

FIG. 2A is a block diagram illustrating a configuration of an electronic apparatus according to an embodiment of the disclosure.

Referring to FIG. 2A, the electronic apparatus 100 may include a communicator 110 and a processor 120.

The communicator 110 may be a communication interface to perform communication with an external apparatus. Specifically, the communicator 110 may perform communication through a WiFi communication method. For this, the communicator 110 may include a WiFi chip.

The processor 120 may be connected to the communicator 110, and control the electronic apparatus 100. Specifically, the processor 120 may be electronically connected to the communicator 110, and control the overall operations and functions of the electronic apparatus 100.

The processor 120 may control the communicator 110 such that the electronic apparatus 100 is connected to an access point.

For example, when a user command for connection to an access point is received, the processor 120 may connect the electronic apparatus 100 to an access point through the communicator 110. In this case, the communicator 110 may be connected to an access point according to a WiFi communication method by using a service set identifier (SSID), a password, a security type, etc. Performing connection of WiFi communication by using such information may be made in various manners.

Meanwhile, the processor 120 may control the electronic apparatus 100 such that the electronic apparatus 100 provides a voice assistant.

In this case, in order that voice recognition for a user voice can be performed, a user command for triggering a voice assistant should be input to the electronic apparatus 100.

Here, a user command for triggering a voice assistant may include a user voice uttering a wakeup word (or, a wakeup command).

In this case, a wakeup word means a trigger word for activating a voice assistant, or for requesting a response of a voice assistant. For voice recognition, a user should utter a wakeup word corresponding to a voice command.

Accordingly, when a user voice that uttered a wakeup word is obtained, the processor 120 may perform voice recognition for the obtained user voice subsequent to the wakeup word, and provide a response for the user voice based on a result of voice recognition.

In this case, a user voice may be received through a microphone provided on the electronic apparatus 100. Alternatively, the electronic apparatus 100 may receive a user voice obtained from another electronic apparatus equipped with a microphone, for example, a remote controller for controlling the electronic apparatus 100 from the electronic apparatus.

Meanwhile, a user command for triggering a voice assistant may include a user input received by selection of a predetermined button.

Here, a predetermined button may be provided on the electronic apparatus 100, or on another electronic apparatus, for example, a remote controller for controlling the electronic apparatus 100. In this case, when a predetermined button is selected, the remote controller may transmit a signal indicating that the predetermined button was selected, to the electronic apparatus 100. Then, the processor 120 may determine whether a user command for triggering a voice assistant was input based on the signal received from the remote controller.

Meanwhile, when a user voice requesting connection of WiFi communication with an external electronic apparatus is obtained, the processor 120 may transmit authentication information for authentication of an external electronic apparatus to the external electronic apparatus 100 through the communicator 110.

Here, authentication information may include a pin code. For example, the processor 120 may generate a pin code consisting of numbers, characters, or a combination thereof.

Specifically, in case the obtained user voice is a user voice requesting connection of WiFi communication with an external electronic apparatus, the processor 120 may transmit authentication information to the external electronic apparatus through the communicator 110.

In this case, the processor 120 may perform voice recognition for the user voice, and identify the intent included in the user voice based on a result of voice recognition, and determine whether the user voice is a user voice requesting connection of WiFi communication with an external electronic apparatus. Alternatively, in case voice recognition is performed at a server, the processor 120 may transmit the obtained user voice to the server. In this case, the server may identify the intent of the user voice, and transmit the intent to the electronic apparatus 100. Accordingly, the processor 120 may determine whether the user voice is a user voice requesting connection of WiFi communication with an external electronic apparatus based on the information received from the server.

Accordingly, the processor 120 may determine whether the obtained user voice is a user voice requesting connection of WiFi communication with an external electronic apparatus.

In this case, when a probe request frame transmitted by an external electronic apparatus is received through the communicator 110, the processor 120 may transmit authentication information to the external electronic apparatus through the communicator 110. Here, after a user voice requesting connection of WiFi communication with an external electronic apparatus is obtained, when a probe request frame transmitted by an external electronic apparatus is received through the communicator 110, the processor 120 may transmit authentication information to the external electronic apparatus through the communicator 110.

Here, in the probe request frame, a bit value of a specific area may be set as a first value.

Specifically, in case a user wishes to use WiFi communication through an external electronic apparatus, a user command for connection of WiFi communication may be input to the external electronic apparatus, and a voice requesting connection of WiFi communication with the external electronic apparatus may be uttered.

Here, a user command for connection of WiFi communication may include a case in which a user selects an object (or, a menu) for connection of WiFi communication displayed on an external electronic apparatus, or a case in which a user selects a specific button of a remote controller for controlling an external electronic apparatus. Also, a user command for connection of WiFi communication may include a case in which a user voice for connection of WiFi communication with an external electronic apparatus is input to the external electronic apparatus.

In this case, the external electronic apparatus may activate a WiFi chip, and broadcast a probe request frame. Here, the external electronic apparatus may set a specific reserve area of the probe request frame as a bit value indicating, for example, a value of 1.

Accordingly, the electronic apparatus 100 may obtain a user voice requesting connection of WiFi communication with the external electronic apparatus, and receive the probe request frame broadcasted from the external electronic apparatus.

Here, in case a specific reserve area of the probe request frame is set as a bit value indicating 1, the processor 120 may determine that the external electronic apparatus needs authentication for WiFi communication, and transmit authentication information to the external electronic apparatus through the communicator 110.

In this case, the processor 120 may transmit a probe response frame including authentication information to the external electronic apparatus through the communicator 110.

Specifically, the processor 120 may transmit a probe response frame to the external electronic apparatus as a response to the probe request frame transmitted from the external electronic apparatus. Here, the processor 120 may add authentication information to the probe response frame, and transmit the authentication information to the external electronic apparatus through the probe response frame.

In this case, the processor 120 may unicast the probe response frame to the external electronic apparatus based on the medium access control (MAC) address of the external electronic apparatus included in the probe request frame. That is, the processor 120 may transmit the probe response frame in which the source MAC address is set as the MAC address of the electronic apparatus 100 and the MAC address of the destination of the probe response frame is set as the MAC address of the external electronic apparatus through the communicator 110.

Meanwhile, the processor 120 may output a voice requesting the user to utter authentication information displayed on the external electronic apparatus. In this case, the processor 120 may output the voice through the speaker of the electronic apparatus 100 or an external speaker connected to the electronic apparatus 100.

Specifically, after transmitting the probe response frame including authentication information to the external electronic apparatus, when the probe request frame transmitted by the external electronic apparatus is received through the communicator 110, the processor 120 may output a voice requesting the user to utter authentication information displayed on the external electronic apparatus.

Here, in the probe request frame, a bit value of a specific area may be set as a second value.

Specifically, in case the external electronic apparatus receives the probe response frame from the electronic apparatus 100, the external electronic apparatus may obtain authentication information from the probe response frame, and display the obtained authentication information on the display of the external electronic apparatus.

Then, the external electronic apparatus may transmit a probe request frame to the electronic apparatus 100.

Specifically, the external electronic apparatus may set a specific reserve area of the probe request frame as a bit value indicating, for example, a value of 2, and unicast the probe request frame to the electronic apparatus 100 based on the MAC address of the electronic apparatus 100 included in the probe response frame received from the electronic apparatus 100.

Accordingly, the processor 120 may receive the probe request frame transmitted by the external electronic apparatus. Also, in case a specific reserve area of the probe request frame is set as a bit value indicating 2, the processor 120 may determine that the external electronic apparatus requests connection information for WiFi communication.

Here, in case a user voice uttering authentication information is not received, authentication for the external electronic apparatus is incomplete. Accordingly, the processor 120 may output a voice requesting a user to utter authentication information displayed on the external electronic apparatus, for authentication of the external electronic apparatus. Meanwhile, in case a user voice uttering authentication information is received, the processor 120 may not output a voice requesting a user to utter authentication information displayed on the external electronic apparatus.

Afterwards, when a user voice corresponding to authentication information is obtained, the processor 120 may transmit connection information for connection to an access point connected to the electronic apparatus 100 to the external electronic apparatus through the communicator 110.

Specifically, in case the obtained user voice is a user voice that uttered authentication information and the authentication information included in the user voice matches the authentication information transmitted to the external electronic apparatus, the processor 120 may transmit connection information for connection to an access point to the external electronic apparatus through the communicator 110.

That is, the processor 120 may perform voice recognition for the obtained user voice, and identify the intent included in the user voice based on a result of voice recognition. Accordingly, in case the user voice has an intent of having uttered authentication information, the processor 120 may obtain authentication information consisting of numbers, letters, or a combination thereof from the user voice. Alternatively, in case voice recognition is performed at a server, the processor 120 may transmit the obtained user voice to the server. In this case, the server may identify the intent included in the user voice received from the electronic apparatus. Also, in case the user voice has an intent of having uttered authentication information, the server may obtain authentication information consisting of numbers, letters, or a combination thereof from the user voice, and transmit the obtained authentication information to the electronic apparatus 100.

Then, the processor 120 may compare the authentication information included in the user voice with the authentication information transmitted to the external electronic apparatus.

Accordingly, in case the authentication information included in the user voice matches or coincides with the authentication information transmitted to the external electronic apparatus, the processor 120 may transmit connection information for connection to an access point to the external electronic apparatus through the communicator 110.

Here, an access point may be an access point connected to the electronic apparatus 100. Also, the connection information may include at least one of an SSID, a password, or a security type of an access point connected to the electronic apparatus 100.

That is, the processor 120 may transmit information on an SSID, a password, a security type, etc. of an access point obtained in the process of connecting the electronic apparatus 100 to the access point to the external electronic apparatus, so that the external electronic apparatus can be connected to the access point for WiFi communication.

Specifically, the processor 120 may transmit a probe response frame to the external electronic apparatus as a response to the probe request frame transmitted by the external electronic apparatus. Here, the processor 120 may add connection information for connection to an access point to the probe response frame, and transmit the connection information to the external electronic apparatus through the probe response frame.

In this case, the processor 120 may unicast the probe response frame including connection information to the external electronic apparatus based on the MAC address of the external electronic apparatus.

Accordingly, the external electronic apparatus may receive the probe response frame transmitted by the electronic apparatus 100, obtain connection information from the probe response frame, and establish connection with an access point by using the connection information.

Meanwhile, in case authentication information included in a user voice is inconsistent with the authentication information transmitted to the external electronic apparatus, the processor 120 does not transmit connection information for connection to an access point to the external electronic apparatus.

In this case, the processor 120 may output a voice for indicating that the spoken authentication information does not match the stored authentication information, through the speaker of the electronic apparatus 100 or an external speaker connected to the electronic apparatus 100.

For example, the processor 120 may output a voice indicating that a user uttered authentication information that does not match, a voice requesting to utter again authentication information displayed on the electronic apparatus 100, etc.

Meanwhile, in case a user voice is not received, or a user voice not having an intent of having uttered authentication information is received, the processor 120 may output a voice requesting to utter authentication information displayed on the electronic apparatus 100.

Figure 2B:
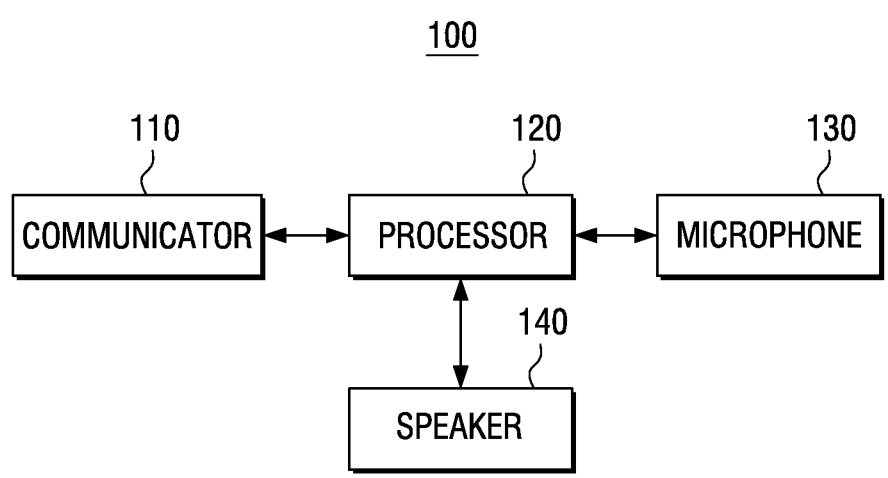
FIG. 2B is a block diagram illustrating a configuration of an electronic apparatus according to an embodiment of the disclosure.

FIG. 2B is a block diagram illustrating a configuration of an electronic apparatus according to an embodiment of the disclosure.

Referring to FIG. 2B, the electronic apparatus 100 may include a communicator 110, a processor 120, a microphone 130, and a speaker 140. These components may be controlled by the processor 120.

Meanwhile, the communicator 110 and the processor 120 perform functions similar to the communicator 110 and the processor 120 illustrated in FIG. 2A. Thus, redundant descriptions regarding these components will be omitted.

The microphone 130 may receive or obtain a user voice. Also, the microphone may convert the voice as a voice signal.

The speaker 140 may output various kinds of notification sounds or voices. For example, the speaker 140 may output a voice requesting a user to utter authentication information displayed on the external electronic apparatus, a voice indicating that a user uttered authentication information does not match stored authentication information, a voice requesting to utter again authentication information displayed on the electronic apparatus 100, etc.

Figure 3:
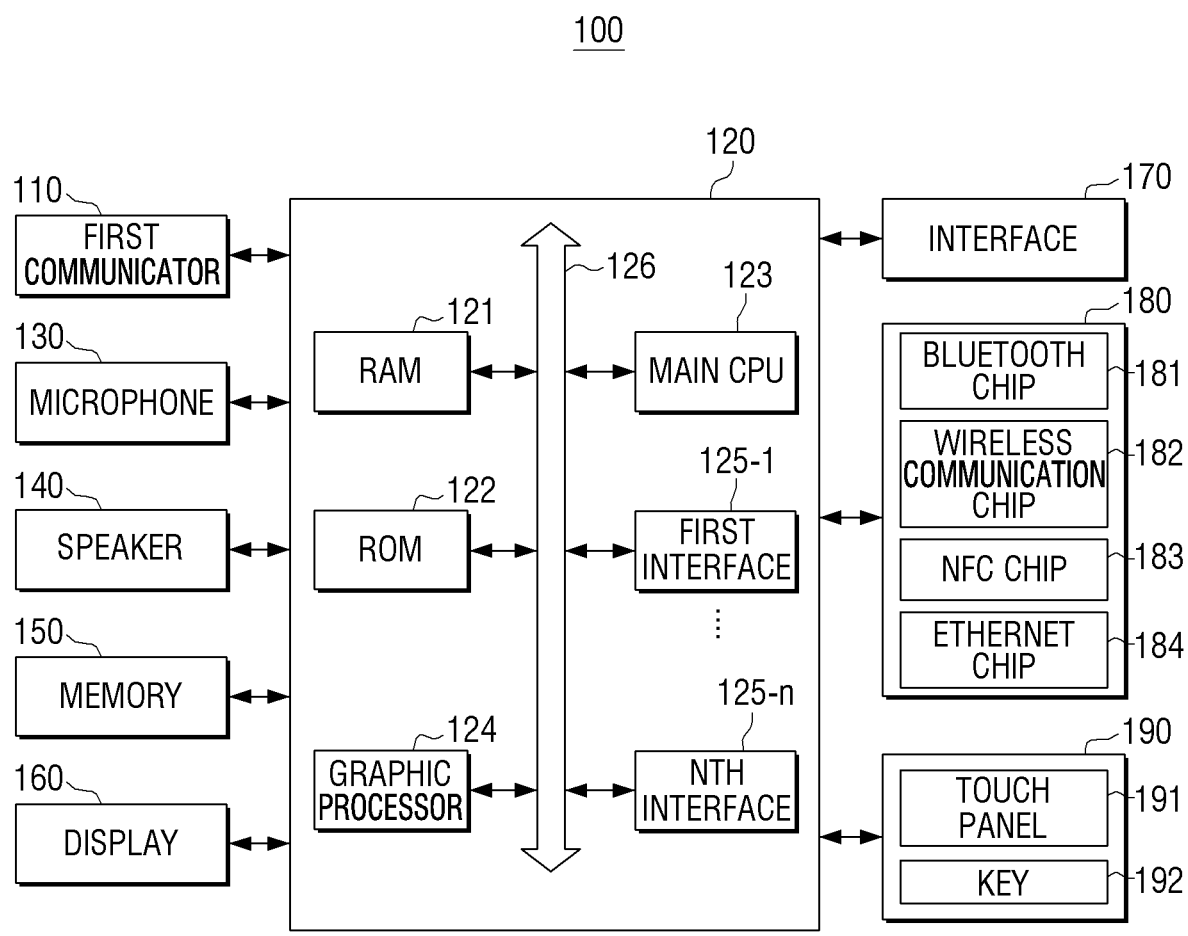
FIG. 3 is a block diagram illustrating a configuration of an electronic apparatus according to an embodiment of the disclosure.

FIG. 3 is a block diagram illustrating a detailed configuration of an electronic apparatus according to an embodiment of the disclosure.

Referring to FIG. 3, the electronic apparatus 100 may include a first communicator 110, a processor 120, a microphone 130, a speaker 140, a memory 150, a display 160, an interface 170, a second communicator 180, and a user interface 190. These components may be controlled by the processor 120 executing one or more applications.

Meanwhile, the first communicator 110, the processor 120, the microphone 130, and the speaker 140 perform functions similar to functions of the communicator 110, the processor 120, the microphone 130, and the speaker 140 illustrated in FIGS. 2A and 2B. Thus, redundant descriptions regarding these components will be omitted.

The memory 150 may store instructions or data related to at least one other component of the electronic apparatus 100. Also, the memory 150 may be implemented as a non-volatile memory, a volatile memory, a flash-memory, a hard disc drive (HDD) or a solid state drive (SSD), etc. Further, the memory 150 may be accessed by the processor 120, and reading/recording/correcting/deleting/updating, etc. of data by the processor 120 may be performed. Meanwhile, in the disclosure, the term memory may include a memory 150, a ROM inside the processor 120, a RAM, or a memory card (e.g., a micro SD card, a memory stick) installed in or coupled to the electronic apparatus 100.

Also, in the memory 150, programs and data, etc. for constituting various screens to be displayed on the display area of the display 160 may be stored. In addition, the memory 150 may store various artificial intelligence models described in the disclosure, for example, an artificial intelligence model for operating a conversation system.

The display 160 may display various screens. For example, the display 160 may display various screens related to the operations of the electronic apparatus 100 and applications executed by the electronic apparatus 100.

In this case, the display 160 may be combined with a touch panel 191, and implemented as a touch screen in a layered structure. The touch screen may have a display function and a function of detecting a location of a touch input, a touched area, and also, the pressure of a touch input. Also, the touch screen may have a function of detecting a real-touch based on physical contact and a proximity touch when a finger or object (stylus, etc.) approaches the touch screen.

The interface 170 may be connected to various external apparatuses. For this, the interface 170 may include various types of ports such as a port for connection to an HDMI cable, etc.

The second communicator 180 may perform communication with various types of external apparatuses according to various types of communication methods. Also, the second communicator 180 may include at least one of a Bluetooth chip 181, a wireless communication chip 182, an NFC chip 183, or an Ethernet chip 184.

In this case, the processor 120 may perform communication with a server or various types of external apparatuses through the second communicator 180.

For example, the processor 120 may access a network by using a wireless communication chip 182 or an Ethernet chip 184, and perform communication with a server and various types of external apparatuses. Also, the processor 120 may perform communication with a remote controller for controlling various types of external apparatuses and the electronic apparatus 100 by using the Bluetooth chip 181.

The user interface 190 may receive input of various user commands, and transmit the input user commands to the processor 120. Also, the user interface 190 may include, for example, a touch panel 191 or a key or keypad 192. The touch panel 191 may use at least one method of sensing touch among a capacitive method, a resistive method, an infrared method, or an ultrasonic method. Also, the touch panel 191 may further include a control circuit. In addition, the touch panel 191 may further include a tactile layer, and provide a tactile response to a user. The key 192 may include, for example, a physical button, an optical key, or a keypad.

In this case, the processor 120 may control other components to execute various functions corresponding to user commands input through the user interface 190.

Also, although not illustrated in FIG. 3, the electronic apparatus 100 may further include a remote controller signal receiver. In this case, the remote controller signal receiver may be implemented as an IR receiver for receiving a remote controller signal transmitted from a remote controller for controlling the electronic apparatus 100.

In this case, the processor 120 may control other components to execute various functions corresponding to a remote controller signal received through the remote controller signal receiver.

Also, the processor 120 may control the overall operations of the electronic apparatus 100 by using various programs stored in the memory 150.

The processor 120 may consist of a RAM 121, a ROM 122, a graphic processor 124, a main CPU 123, first to nth interfaces 125-1~125-n, and a bus 126. Here, the RAM 121, the ROM 122, the graphic processor 124, the main CPU 123, the first to nth interfaces 125-1~125-n, etc. may be connected to one another through at least one bus 126.

Figure 4:
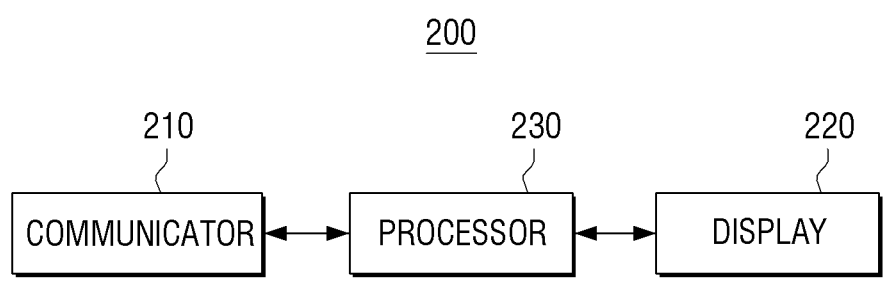
FIG. 4 is a block diagram illustrating a configuration of an external electronic apparatus according to an embodiment of the disclosure.

FIG. 4 is a block diagram illustrating a configuration of an external electronic apparatus according to an embodiment of the disclosure.

Referring to FIG. 4, the electronic apparatus 200 may include a communicator 210, a display 220, and a processor 230.

The communicator 210 may perform communication with an external apparatus. Specifically, the communicator 210 may perform communication through a WiFi communication method. For this, the communicator 210 may include a WiFi chip.

The display 220 may display various screens. Specifically, the display 220 may display authentication information received from the electronic apparatus 100.

The processor 230 may be connected to the communicator 210 and the display 220, and control the electronic apparatus 200. Specifically, the processor 230 may be electronically connected to the communicator 210 and the display 220, and control the overall operations and functions of the electronic apparatus 200.

If a user command for connection of WiFi communication is received, the processor 230 may activate the communicator 210, i.e., turn on a WiFi chip, and transmit a probe request frame through the communicator 210.

For example, in case an object for connection of WiFi communication displayed on the display 220 is selected, or a user command selecting a specific button of a remote controller for controlling an external electronic apparatus is received from a remote controller, the processor 230 may activate a WiFi chip, and transmit a probe request frame through the WiFi chip.

As another example, if a user voice requesting connection of WiFi communication with the electronic apparatus 200 is received, the processor 230 may activate a WiFi chip, and transmit a probe request frame through the WiFi chip.

In this case, a user voice may be received through a microphone provided on the electronic apparatus 200. Alternatively, the electronic apparatus 200 may receive a user voice obtained from another electronic apparatus equipped with a microphone, for example, a remote controller for controlling the electronic apparatus 200, etc. from the electronic apparatus.

Accordingly, when a user voice is obtained, the processor 230 may determine whether the obtained user voice has an intent of requesting connection of WiFi communication with the electronic apparatus 200. For this, the electronic apparatus 200 may have stored various modules for voice recognition.

Meanwhile, when transmitting a probe request frame, the processor 230 may set a bit value of a specific area of the probe request frame as a first value. For example, the processor 230 may set a specific reserve area of the probe request frame as a bit value indicating, for example, a value of 1.

Then, the processor 230 may broadcast the probe request frame including the MAC address of the electronic apparatus 200 through the communicator 210.

Meanwhile, when a probe response frame transmitted by the electronic apparatus 100 in response to transmission of the probe request frame is received, the processor 230 may obtain authentication information from the probe response frame, and display authentication information through the display 220.

Here, authentication information may include a pin code.

Then, the processor 230 may transmit the probe request frame to the electronic apparatus 100 through the communicator 210.

Here, in the probe request frame, a bit value of a specific area may be set as a second value.

Specifically, the processor 230 may set a specific reserve area of the probe request frame as a bit value indicating, for example, a value of 2, and unicast the probe request frame to the electronic apparatus 100 based on the MAC address of the electronic apparatus 100 included in the probe response frame received from the electronic apparatus 100.

Then, the processor 230 may receive the probe response frame transmitted by the electronic apparatus 100 in response to transmission of the probe request frame, and obtain connection information for connection to an access point from the probe response frame.

Here, connection information may include at least one of an SSID, a password, or a security type of an access point.

In this case, the processor 230 may control the communicator 210 to perform connection to an access point by using the obtained connection information.

Accordingly, the electronic apparatus 200 may be connected to an access point.

FIGS. 5A, 5B, 5C, and 5D are diagrams illustrating a method of performing connection of WiFi communication according to an embodiment of the disclosure.

Figure 5A:
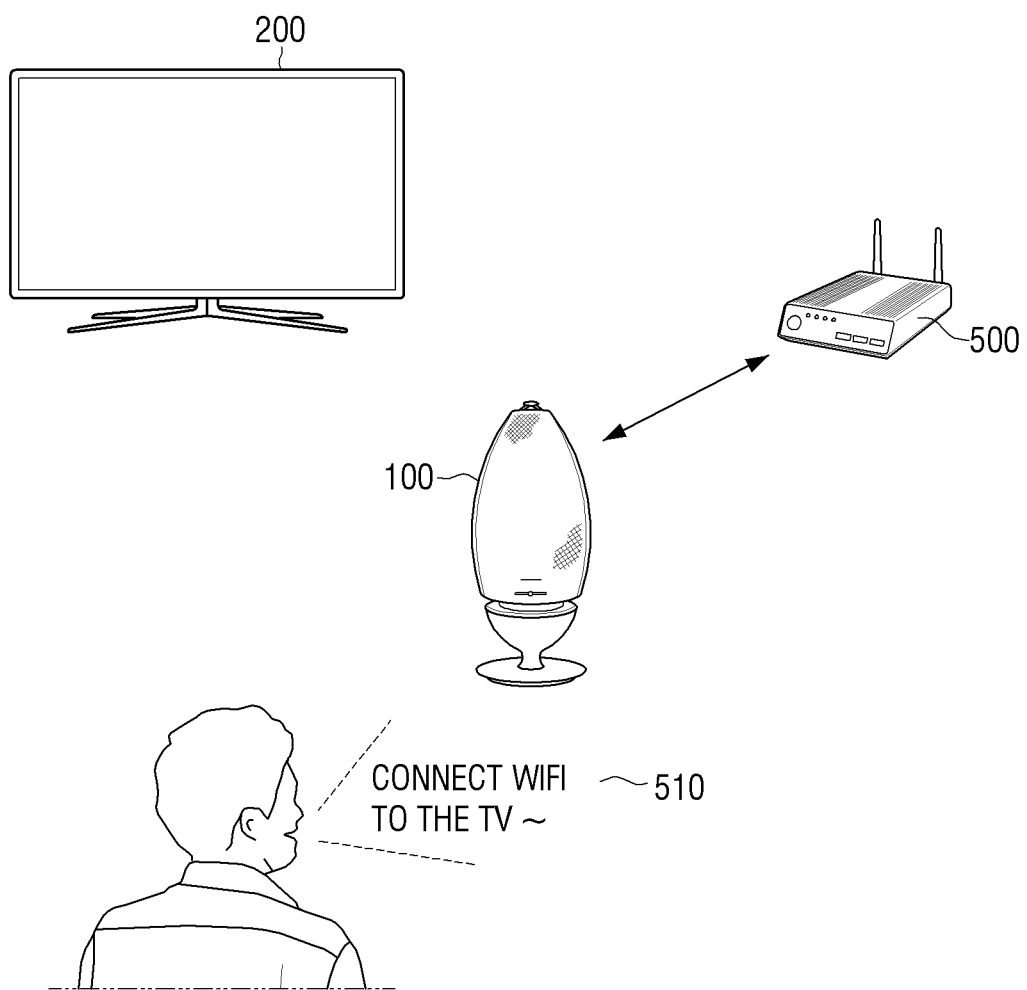
FIG. 5A is a diagram illustrating a method of performing connection of WiFi communication according to an embodiment of the disclosure.

First, referring to FIG. 5A, a user may utter "Connect the WiFi to the TV" 510, to establish WiFi connection to a TV 200, and the electronic apparatus 100 which is in a state of having already established connection to an access point 500 may receive the user voice 510 through a microphone.

Figure 5B:
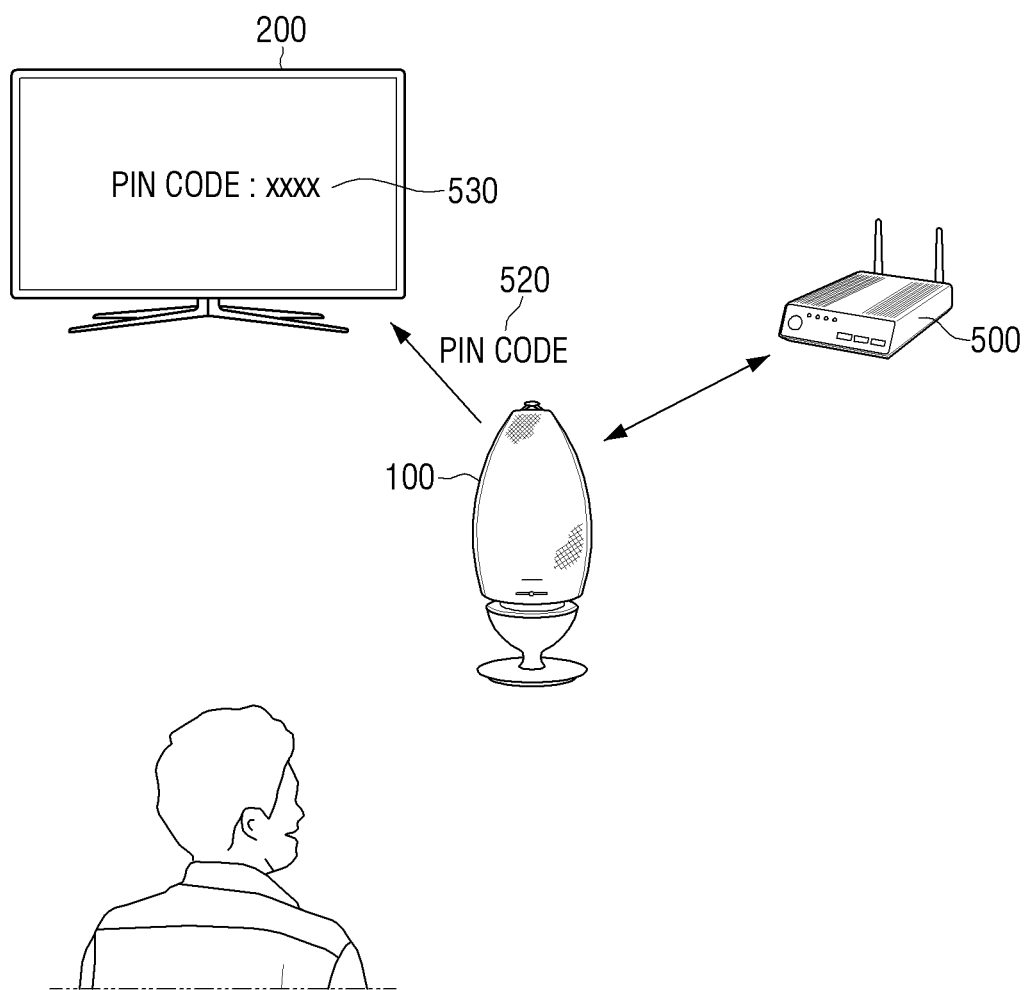
FIG. 5B is a diagram illustrating a method of performing connection of WiFi communication according to an embodiment of the disclosure.

In this case, as illustrated in FIG. 5B, in case a user voice requests connection of WiFi communication with the TV 200, the electronic apparatus 100 may transmit authentication information, i.e., a pin code 520 to the TV 200.

Accordingly, the TV 200 may display the pin code 520 received from the electronic apparatus 100 on the display of the TV 200. For example, as illustrated in FIG. 5B, the TV 200 may display "The pin code is XXXX" 530.

Figure 5C:
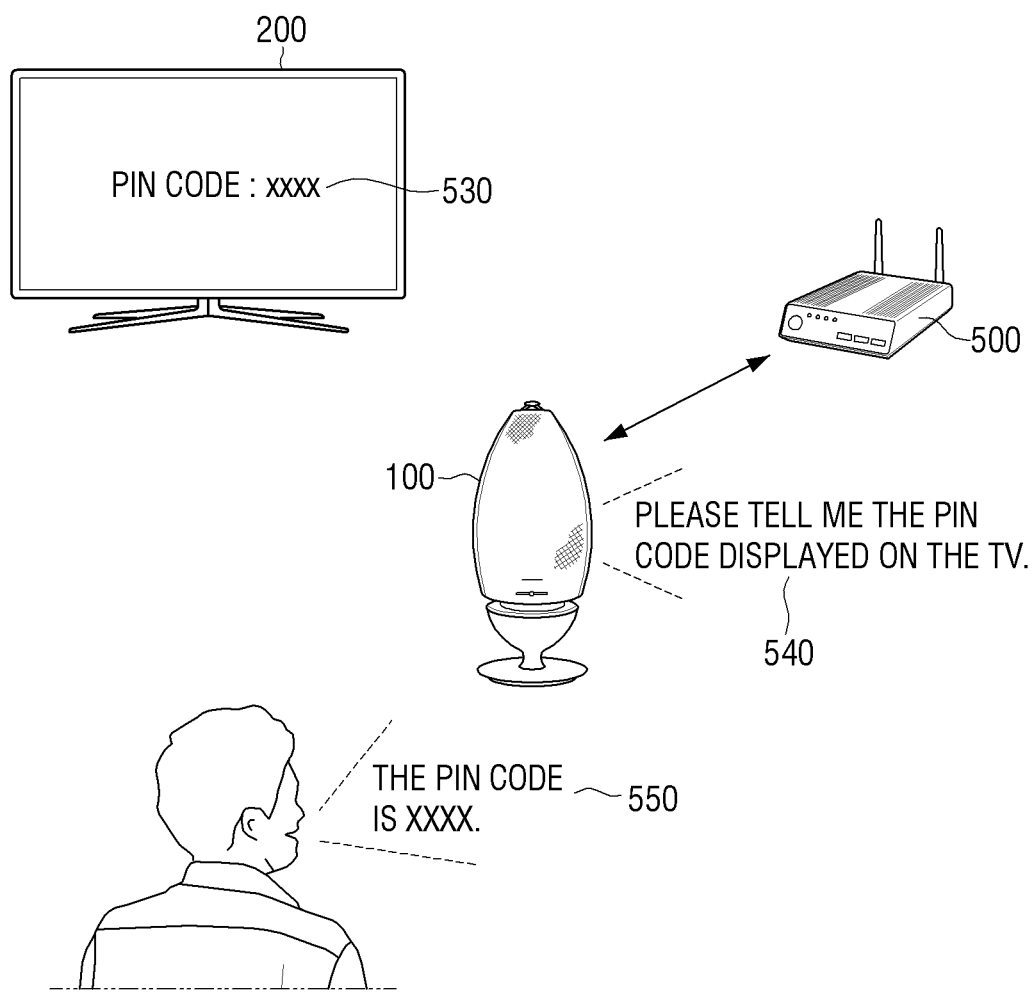
FIG. 5C is a diagram illustrating a method of performing connection of WiFi communication according to an embodiment of the disclosure.

Here, as illustrated in FIG. 5C, the electronic apparatus 100 may output a voice requesting utterance of the pin code displayed on the TV, such as "Please tell me the pin code displayed on the TV" 540 through a speaker. Afterwards, in case the user utters a reply, such as "The pin code is XXXX" 550, the electronic apparatus 100 may receive the user's reply through a microphone.

Figure 5D:
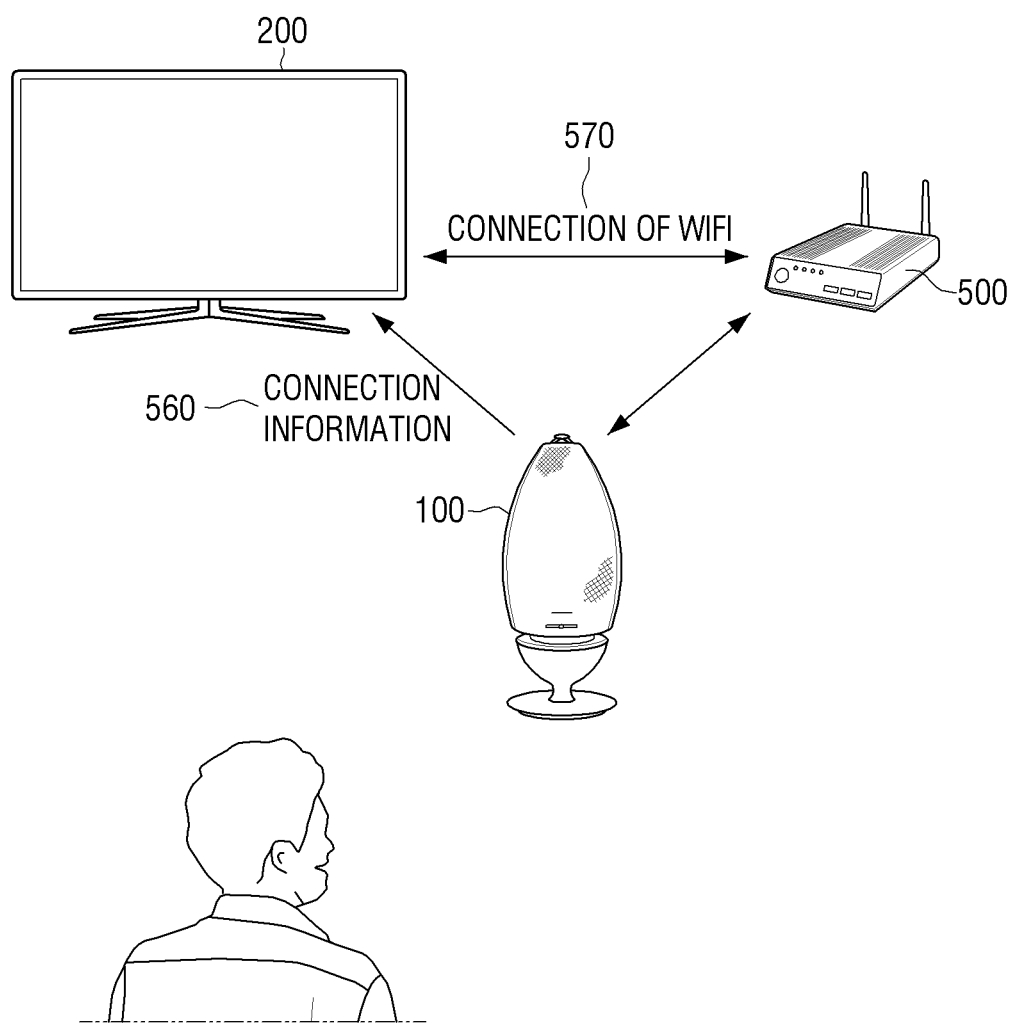
FIG. 5D is a diagram illustrating a method of performing connection of WiFi communication according to an embodiment of the disclosure.

In this case, the electronic apparatus 100 may determine whether the pin code included in the user voice matches the pin code transmitted to the TV 200, and if the pin code 530 displayed on the TV 200 corresponds to the pin code 500 spoken by the user, the electronic apparatus 100 may transmit connection information 560 for connection to an access point 500, for example, information on the SSID, the password, and the security type of the access point 500 to the TV 200, as illustrated in FIG. 5D.

Accordingly, as illustrated in FIG. 5D, the TV 200 may receive connection information from the electronic apparatus 100, and automatically establish WiFi communication with the access point by using the connection information 570.

As described above, according to an embodiment of the disclosure, the electronic apparatus 100 performs authentication of an external electronic apparatus for connection to an access point by using a user voice, and when an external electronic apparatus is authenticated, the electronic apparatus 100 transmits connection information for connection to an access point to the external electronic apparatus. Accordingly, user convenience for establishing WiFi communication with an external device, such as a TV, can be increased.

Figure 6:
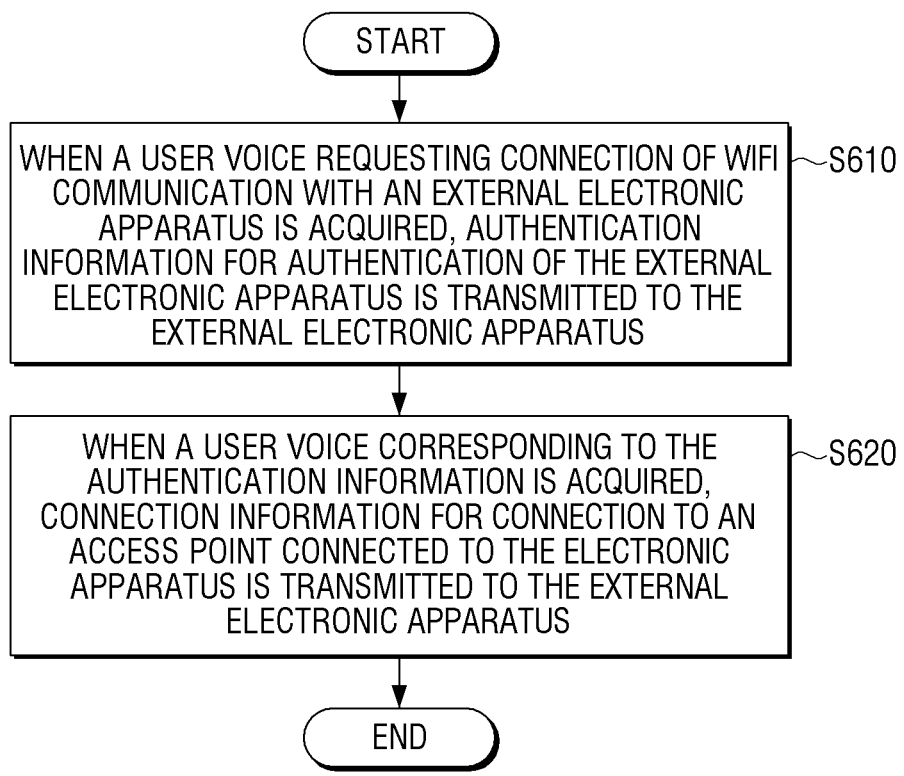
FIG. 6 is a flow chart illustrating a method of establishing WiFi connection according to an embodiment of the disclosure.

FIG. 6 is a flow chart illustrating a method of establishing WiFi connection according to an embodiment of the disclosure.

First, when a user voice requesting connection of WiFi communication with an external electronic apparatus is obtained, authentication information for authentication of the external electronic apparatus is transmitted to the external electronic apparatus at operation S610.

Afterwards, when a user voice corresponding to the authentication information is obtained, connection information for connection to an access point connected to the electronic apparatus is transmitted to the external electronic apparatus at operation S620.

Specifically, at operation S610, in case the obtained user voice is a user voice requesting connection of WiFi communication with an external electronic apparatus, authentication information may be transmitted to the external electronic apparatus.

More specifically, when a probe request frame transmitted by the external electronic apparatus is received, authentication information may be transmitted to the external electronic apparatus.

In this case, in the probe request frame, a bit value of a specific area may be set as a first value.

Meanwhile, at operation S610, a probe response frame including the authentication information may be transmitted to the external electronic apparatus.

Meanwhile, in a WiFi connecting method according to an embodiment of the disclosure, a voice requesting the user to utter authentication information displayed on an external electronic apparatus may be output by the electronic apparatus.

Specifically, after a probe response frame including authentication information is transmitted to an external electronic apparatus, when a probe request frame transmitted by the external electronic apparatus is received, a voice requesting the user to utter authentication information displayed on the external electronic apparatus may be output by the electronic apparatus through a speaker.

In this case, in the probe request frame, a bit value of a specific area may be set as a second value.

Meanwhile, at operation S620, in case the obtained user voice includes the authentication information, and the authentication information included in the user voice is matched with the authentication information transmitted to the external electronic apparatus, connection information for connection to an access point may be transmitted to the external electronic apparatus.

Meanwhile, authentication information may include a pin code, and connection information may include at least one of a service set identifier (SSID), a password, or a security type of an access point.

Meanwhile, with respect to a detailed method for an electronic apparatus to connect an external electronic apparatus to an access point based on a user voice, descriptions have been made above.

The term "module" used in the disclosure includes a unit consisting of hardware, software, or firmware, and it may be interchangeably used with terms, for example, logic, a logical block, a component, or a circuit. Also, a module may be a component consisting of an integrated body or a minimum unit performing one or more functions or a portion thereof. For example, a module may consist of an application-specific integrated circuit (ASIC).

An embodiment of the disclosure may be implemented as software including instructions stored in machine-readable storage media, which can be read by machines (e.g.: computers). The machines refer to apparatuses that read instructions stored in a storage medium and load the instructions into memory, and can operate according to the loaded instructions, and the apparatuses may include an electronic apparatus according to the aforementioned embodiments (e.g.: an electronic apparatus A). In case the instructions are executed by a processor, the processor may perform functions corresponding to the instructions by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to an embodiment described in the disclosure may be provided while being included in a computer program product. A computer program product refers to a product, which may be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g.: a module or a program) may consist of a singular object or a plurality of objects. Also, among the aforementioned corresponding sub components, some sub components may be omitted, or other sub components may be further included in an embodiment. Generally or additionally, some components (e.g.: a module or a program) may be integrated as an object, and perform the functions that were performed by each of the components before integration identically or in a similar manner. A module, a program, or operations performed by other components according to an embodiment may be executed sequentially, in parallel, repetitively, or heuristically. Or, at least some of the operations may be executed or omitted in a different order, or other operations may be added.

What is claimed is:

1. An electronic apparatus comprising:
   a communicator; and
   a processor configured to:
   receive a first user voice comprising a request to establish WiFi communication between an external electronic apparatus and an access point,
   receive a first probe request frame transmitted by the external electronic apparatus through the communicator,
   transmit a probe response frame comprising authentication information to the external electronic apparatus through the communicator based on receiving the first user voice and the first probe request frame,
   receive a second probe request frame transmitted by the external electronic apparatus through the communicator,
   control the electronic apparatus to output a voice requesting a user to speak the authentication information displayed on the external electronic apparatus based on receiving the second probe request frame, and
   based on receiving a second user voice corresponding to the authentication information displayed on the external electronic apparatus, transmit connection information for establishing the WiFi communication between the external electronic apparatus and the access point to the external electronic apparatus through the communicator.

2. The electronic apparatus of claim 1, wherein the processor is further configured to:
   determine that the first user voice comprises the request to establish the WiFi communication between the external electronic apparatus and the access point, and
   transmit the probe response frame comprising the authentication information to the external electronic apparatus through the communicator based on a result of determining that the first user voice comprises the request to establish the WiFi communication between the external electronic apparatus and the access point.

3. The electronic apparatus of claim 1, wherein the first probe request frame comprises a first value indicating a request for the authentication information.

4. The electronic apparatus of claim 1, wherein the second probe request frame comprises a second value.

5. The electronic apparatus of claim 1, wherein the processor is further configured to:
   determine that the second user voice corresponds to the authentication information displayed on the external electronic apparatus, and
   transmit the connection information to the external electronic apparatus through the communicator based on determining that the second user voice corresponds to the authentication information displayed on the external electronic apparatus.

6. The electronic apparatus of claim 1, wherein the authentication information comprises a pin code, and
   wherein the connection information comprises at least one of a service set identifier (SSID), a password, or a security type of the access point.

7. A method of establishing WiFi communication between an external electronic apparatus and an access point by an electronic apparatus, the method comprising:
   receiving a first user voice comprising a request to establish the WiFi communication between the external electronic apparatus and the access point;
   receiving a first probe request frame transmitted by the external electronic apparatus,
   transmitting a probe response frame comprising authentication information to the external electronic apparatus based on receiving the first user voice and the first probe request frame,
   receiving a second probe request frame transmitted by the external electronic apparatus, outputting a voice requesting a user to speak the authentication information displayed on the external electronic apparatus based on receiving the second probe request frame, and based on receiving a second user voice corresponding to the authentication information displayed on the external electronic apparatus, transmitting connection information for establishing the WiFi communication between the external electronic apparatus and the access point to the external electronic apparatus.

8. The method of claim 7, wherein transmitting the probe response frame comprising the authentication information comprises:

determining that the first user voice comprises the request to establish the WiFi communication between the external electronic apparatus and the access point; and transmitting the probe response frame comprising the authentication information to the external electronic apparatus based on a result of the determining.

9. The method of claim 7, wherein the first probe request frame comprises a first value indicating a request for the authentication information.

10. The method of claim 7, wherein the second probe request frame comprises a second value.

11. The method of claim 7, wherein transmitting the connection information comprises:

determining that the second user voice corresponds to the authentication information displayed on the external electronic apparatus; and transmitting the connection information to the external electronic apparatus based on determining that the second user voice corresponds to the authentication information displayed on the external electronic apparatus.

12. The method of claim 7, wherein the authentication information comprises a pin code, and wherein the connection information comprises at least one of a service set identifier (SSID), a password, or a security type of the access point.

* * * * *